Aug. 11, 1936.  H. H. WOLFE  2,050,642
RAILWAY CAR TRUCK
Filed April 5, 1932
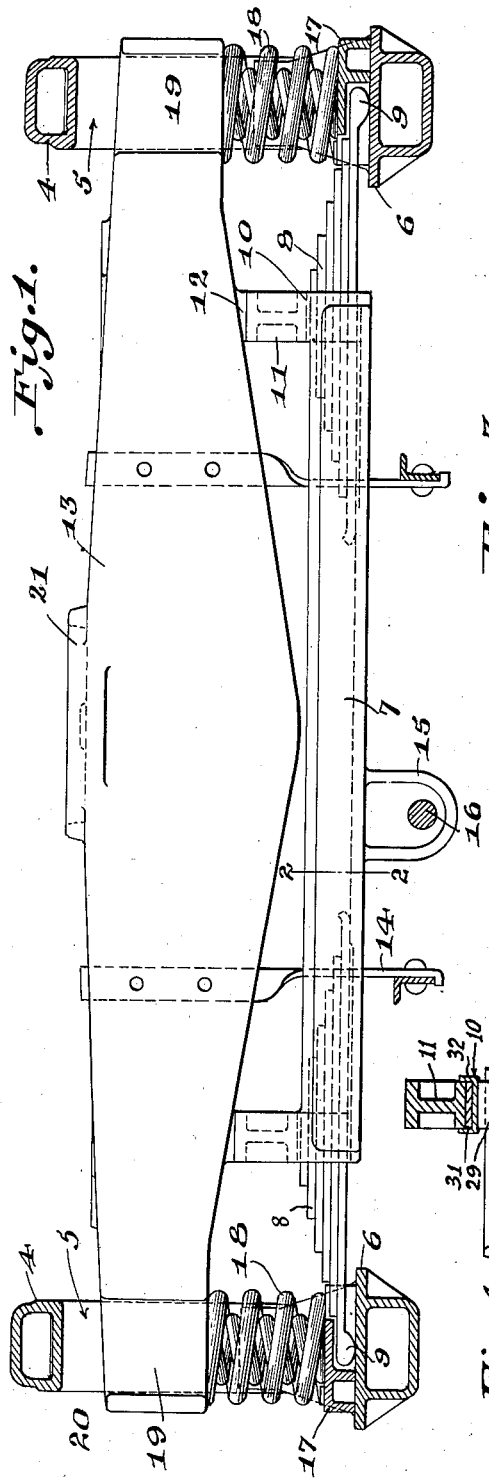
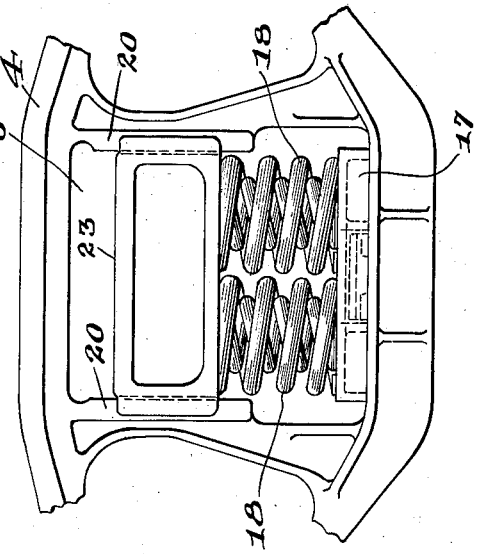
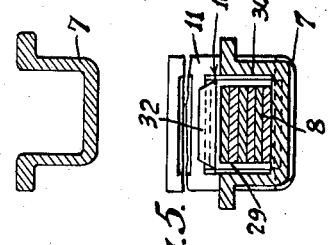
Inventor
H. H. Wolfe
By Seymour & Bright
Attorneys

Patented Aug. 11, 1936

2,050,642

UNITED STATES PATENT OFFICE 2,050,642

RAILWAY CAR TRUCK

Harry H. Wolfe, Columbus, Ohio, assignor to The Buckeye Steel Castings Company, Columbus, Ohio Application April 5, 1932, Serial No. 603,360

15 Claims. (Cl. 105—197.1)

This invention relates to railway car trucks especially adapted to present day high-speed movement of freight and the like, and my invention is an improvement on the constructions disclosed in the application of Charles B. Goodspeed, Serial No. 603,374 filed April 5, 1932.

Practically all freight cars are supported on coil or helical springs which constitute the entire means for resiliently supporting the car body and its lading. It is known that coil springs absorb but very little of the work of compression applied to the springs, and as a result, at certain car speeds, known as "critical speeds", the period of vibration of coil springs coincides with impulses to the wheels due to passing over rail joints and other track irregularities. This causes the amplitude of the springs to build up and results in excessive "dancing" of car bodies on the springs, which sometimes drives the coil springs solid, and in general results in damage to the car and its contents, and to the rails.

One of the principal objects of the present invention is a novel means for introducing laminated springs into the resilient support for the car body and lading.

A further object is to provide means for partially housing laminated springs and to act as a safety support for the brake rigging of a car truck.

Another object is to furnish novel means for supporting a truck bolster intermediate its ends.

Another object is to replace the commonly used spring plank of a car truck with a novel laminated spring assembly.

With the foregoing objects outlined and with other objects in view which will appear as the description proceeds, the invention consists in the novel features hereinafter described in detail, illustrated in the accompanying drawing, and more particularly pointed out in the appended claims.

In the drawing,

Fig. 1 is a side elevation of the improved arrangement, taken vertically and transversely through a car truck.

Fig. 2 is a vertical sectional view of a detail on the line 2—2 of Fig. 1.

Fig. 3 is an elevation of a portion of one of the side frames shown in combination with the new arrangement of parts.

Fig. 4 is a longitudinal section of one end portion of the laminated spring housing showing the manner of loading and retaining a spring.

Fig. 5 is transverse vertical sectional view of the structure shown in Fig. 4.

Referring to the drawing, 4 designates a car truck side frame provided with the usual bolster openings 5 having customary spring seats 6 at their bottoms.

In accordance with the present invention, a channel-shaped housing 7 extends transversely of the truck and partially houses a pair of laminated springs 8. These springs project from opposite ends of the housing, and the lower leaf of each spring has a rounded head 9 which rests upon one of the spring seats 6. Of course, it is not necessary to use only the rounded head 9 for the spring end, as any suitable shape of spring end may be used. Also, instead of using one laminated spring at each end of the housing it may be desirable in trucks of high capacity to use a plurality of parallel laminated springs at each end of the housing. The intermediate portion of each laminated spring is clamped to the housing, as indicated at 10, and from each end of the housing projects an upstanding extension 11 on which rests a pad 12 formed on the bottom of a bolster 13. The extension 11 may be shaped to directly engage the bottom of the bolster if desired and thereby eliminate the pad 12. As the springs 8 are clamped to the housing 7 and rest on the side frames 4, it will be understood that the bolster is partially supported by the spring assembly comprising the parts 7, 8 and 11.

Attachments 14 are fastened to the bolster to provide safety supports for brake beams, not shown. The housing 7 has integrally connected therewith a loop 15, which acts as a safety support for the usual bottom brake lever connector 16.

Spring supports 17 are interlocked with the seat 6 by any suitable means and carry coil springs 18 which support the ends 19 of the bolster, and it will be understood that these ends are slidably interlocked with the bolster opening columns 20, by any suitable means.

Referring to the clamping of the springs to the housing, it will be noted from Figs. 4 and 5, that at each end of the housing the spring 8 is entirely surrounded by the housing which has upstanding extensions 11 to engage the bolster pads 12. A spring band 29 engages a recess 30 in the housing immediately below the extension 11. A removable plate 31 is inserted after the spring and housing are in relative position, and then the retainer 22 of bendable metal is inserted between the band 29 and the plate for locking the housing and spring together.

The operation of the truck may be briefly described as follows.

The car body rests on the usual center plate 21 of the truck bolster, which is resiliently supported by the springs 8 and 18. These springs act in unison or parallel, and are supported by the side frames 4. The laminated springs 8 may be so arranged that they will come in action before the coil springs, or just the reverse. The springs may also be arranged to come into action simultaneously. The bolster load is tranferred to the laminated springs, preferably at the two points 12, rather than at the center only, as the former increases the load carrying capacity of the springs 8, and also supports the bolster to better advantage.

The laminated springs dissipate a portion of the work of spring compression, and prevent oscillations in the coil springs from building up and damaging car and contents.

The spring assembly 7 and 8 is more economical of laminated spring material than if a single laminated spring extended from one side frame to the other, for instead of having the spring leaves running entirely across the truck from side frame to side frame, a substantially half-elliptic spring 8 is used at each end of the housing 7, and the same effect is obtained as if the spring leaves were continued across the truck. It is obvious that the quantity of spring material needed for this construction is greatly reduced without affecting the load carrying capacity of the laminated springs, and hence their use will greatly reduce the weight and cost of the truck.

While I have disclosed what I now consider to be a preferred embodiment of the invention in such manner that the same may be readily understood by those skilled in the art, I am aware that changes may be made in the details disclosed, without departing from the spirit of the invention, as expressed in the claims.

What I claim and desire to secure by Letters Patent is:

1. A car truck including side frames, a housing intermediate said frames, and a plurality of laminated springs secured to the housing and having projecting ends supported by the side frames, said housing and laminated springs being positioned in the place normally occupied by a conventional spring plank.

2. A car truck including side frames, a housing intermediate said frames, a plurality of laminated springs secured to the housing and having projecting ends supported by the side frames, and upstanding bolster supporting extensions mounted on the housing.

3. A spring assembly to be substituted for the conventional spring plank of a railway car truck, comprising an elongated housing, a plurality of laminated springs arranged partially within the housing and having projecting ends adapted to rest on the side frames of a railway car truck, the major portion of said housing being of channel-shaped cross section, and projecting members on the housing for supporting a bolster.

4. A spring assembly to be substituted for the conventional spring plank of a railway car truck, comprising an elongated housing, and a plurality of laminated springs arranged partially within the housing and having projecting ends adapted to rest on the side frames of a railway car truck, the medial portions of the laminated springs being clamped to said housing.

5. A spring assembly to be substituted for the conventional spring plank of a railway car truck, comprising an elongated housing, and a plurality of laminated springs arranged partially within the housing and having projecting ends adapted to rest on the side frames of a railway car truck, the medial portions of the laminated springs being clamped to the end portions of the housing.

6. A spring assembly to be substituted for the conventional spring plank of a railway car truck, comprising an elongated housing, a plurality of laminated springs arranged partially within the housing and having projecting ends adapted to rest on the side frames of a railway car truck, and upstanding bolster supporting extensions arranged at the end portions of the housing.

7. In a structure of the character described, an elongated housing of substantially U-shaped cross section having upstanding bolster supporting extensions at its ends, and a loop rigidly attached to the under side of said housing and adapted to act as a safety support for the usual bottom brake lever connector.

8. A car truck comprising spaced side frames having bolster openings, a housing positioned between said side frames, a plurality of laminated springs secured to the housing and having ends projecting from the housing and resting on said side frames, coil springs supported by the side frames, and load supporting means carried by said housing and said coil springs.

9. A car truck comprising spaced side frames having bolster openings, a housing positioned between said side frames, a plurality of laminated springs secured to the housing and having ends projecting from the housing and resting on said side frames, coil springs supported by the side frames, load supporting means carried by said housing and said coil springs, and spring supports arranged at the bottom of the bolster opening and supporting the coil springs.

10. A railway car truck comprising spaced side frames, a housing arranged transversely of the truck and positioned between said frames, a plurality of laminated springs secured to the housing and having projecting ends resting on the side frames, coil springs supported by the side frames, and load supporting means resting partially on said housing and partially on the coil springs.

11. In a railway car truck having side frames and a bolster, a spring assembly occupying the position on the conventional spring plank and comprising an elongated housing, and a plurality of laminated springs arranged partially within the housing and having projecting ends resting on the side frames, said springs and housing supporting said bolster and each spring consisting of superposed leaves.

12. A car truck including side frames, a bolster, a housing intermediate said frames and positioned below said bolster, and a plurality of laminated springs secured to the housing and supporting said bolster through the medium of the housing, said spring having projecting ends supported by the side frames.

13. A car truck including side frames, a housing intermediate said frames, a plurality of laminated springs secured to the housing and having projecting ends supported by the side frames, the medial portion of each laminated spring being clamped to said housing, and a bolster supported by said housing and springs.

14. A car truck including side frames, a housing intermediate said frames, a plurality of laminated springs secured to the housing and having projecting ends supported by the side frames, the medial portion of each laminated spring being clamped to an end portion of said housing, and a bolster supported by said housing and springs.

15. A spring assembly to be substituted for the conventional spring plank of a railway car truck comprising an elongated housing, and a plurality of laminated springs arranged partially with the housing and having projecting ends adapted to rest on the side frames of a railway car truck, said housing having members supported by the springs for carrying a bolster.

HARRY H. WOLFE.